United States Patent [19]
Guazzoni

[11] Patent Number: 5,647,916
[45] Date of Patent: Jul. 15, 1997

[54] HYBRID PHOTOVOLTAIC SOLAR PANELS

[75] Inventor: Guido E. Guazzoni, Ocean, N.J.

[73] Assignee: The United States of America as represented by the Secretary of the Army, Washington, D.C.

[21] Appl. No.: 594,826

[22] Filed: Dec. 14, 1995

[51] Int. Cl.$^6$ .......................... H02N 6/00; H01L 31/045
[52] U.S. Cl. ............................................. 136/253; 136/245
[58] Field of Search ...................... 136/245, 253; 431/100, 105, 111

[56] References Cited

U.S. PATENT DOCUMENTS

| | | | |
|---|---|---|---|
| 5,356,487 | 10/1994 | Goldstein et al. | 136/253 |
| 5,383,976 | 1/1995 | Fraas et al. | 136/253 |
| 5,439,532 | 8/1995 | Fraas | 136/253 |

*Primary Examiner*—Aaron Weisstuch
*Attorney, Agent, or Firm*—Michael Zelenka; William H. Anderson

[57] ABSTRACT

A mantle or emitter used to illuminate a photovoltaic cell. In one embodiment, a tubular mantle or emitter is made of a composite structure including a rare-earth material, such as ytterbium oxide, covering a porous ceramic, such as alumina or zirconia, formed on a metal or ceramic support mesh. A hydrocarbon fuel-air mixture is forced into the mantle causing combustion and the rare-earth material to heat up to incandescent temperature, creating a highly radiant selective emitting surface. In another embodiment, a tubular burner-emitter having a mantle surrounded by an inner and outer glass tube permits the preheating of air used for combustion within a toroidal gap formed by the inner and outer glass tubes. In another embodiment, a tubular burner-emitter is used in combination with hinged photovoltaic cells or solar panels so that the photovoltaic cells can be positioned around the burner-emitter so that electromagnetic radiation from the burner-emitter causes the photovoltaic cells to create electrical energy. In another embodiment, a planar burner-emitter is used to illuminate a flat photovoltaic cell or panel. The present invention greatly enhances the efficiency and practicality of photovoltaic cells and permits electrical power to be generated continuously and independently of sunlight availability.

16 Claims, 4 Drawing Sheets

HYBRID PHOTOVOLTAIC SOLAR PANELS

GOVERNMENT INTEREST

The invention described herein may be manufactured, used, and licensed by or for the Government for governmental purposes without the payment to me of any royalty thereon.

FIELD OF THE INVENTION

This invention relates in general to the production of electricity with photovoltaic cells, and more specifically to artificial illumination sources used in conjunction with photovoltaic cells or panels.

BACKGROUND OF THE INVENTION

Photovoltaic cells or solar panels directly convert sunlight into electric energy. The efficiency of photovoltaic cells is increasing with improvements in cell conversion efficiency, currently approximately 15% for commercially available multi-crystal silicon cells. With these increased efficiencies and a reduction in cell manufacturing costs, photovoltaic cells or solar panels are becoming an important and viable source of electric power. However, even with these increasing efficiencies and reducing costs, photovoltaic cells or solar panels only have limited use because they can produce electrical power for only a few daylight hours. Therefore, there is a need to extend the use of photovoltaic cells or solar panels, making them efficient producers of electrical energy independent of sunlight or inclement weather. There is additionally a need to supply continuous or on demand electrical power, independent of available daylight or the weather.

SUMMARY OF THE INVENTION

The present invention is directed to a light source used in conjunction with photovoltaic cells or solar panels for producing electricity on demand or continuously independent of the availability of sunlight or weather conditions. The present invention comprises a mantle or emitter heated to incandescent temperature by combustion of a fuel to produce electromagnetic radiation or light. The light is provided to a photovoltaic cell or solar panel construction, eliminating the dependency of the photovoltaic cell or solar panel on sunlight for the production of electrical power. In one embodiment, the mantle comprises a selective emitter having a composite construction of mesh, porous ceramic, and rare-earth ceramic fibers. In another embodiment, a tubular mantle is concentrically enclosed within an inner and outer glass tube forming a pair of toroidal gaps. The inner toroidal gap is used to expel combustion gases and the outer toroidal gap is used to preheat air used by the mantle in the combustion process. A heat exchanger is placed at one end of the burner-emitter tube to make use of heat generated by the combustion process. The burner-emitter tube is used in combination with a multiple section photovoltaic cell or solar panel which is positioned flat when sunlight is available, and folded over the burner-emitter tube so that light generated by the burner-emitter tube illuminates the photovoltaic cells or solar panels producing electricity. In another embodiment, a stationary flat photovoltaic cell or solar panel is illuminated with a planar burner-emitter array which is swung in and out of position over the stationary planar photovoltaic cell or solar panel. The planar burner emitter array provides illumination for the production of electrical power independent of sunlight. In another embodiment, a burner-emitter, in cylindrical, flat, or other configuration, is combined with a light concentrator and located under a solar cell panel that is pivoted to rotate one hundred and eighty degrees to face the burner-emitter when sunlight is not available.

Accordingly, it is an object of the present invention to efficiently produce electrical power with photovoltaic cells or solar panels independent of sunlight or weather conditions.

It is an advantage of the present invention that electrical power can be produced continuously or on demand.

It is a feature of the present invention that light is created to illuminate photovoltaic solar panels.

It is another feature of the present invention that a mantle of a composite structure is used.

It is yet another feature of the present invention that a selective emitter is used for the mantle.

These and other objects, advantages, and features will become readily apparent in view of the following more detailed description.

DETAILED DESCRIPTION OF THE PREFERRED EMBODIMENTS

Figure 1:
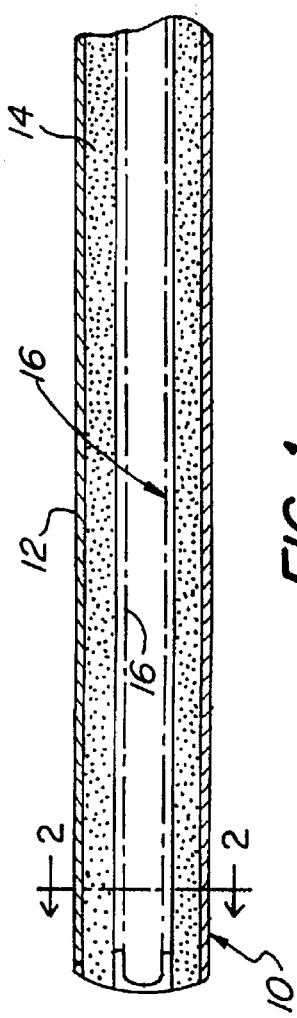
FIG. 1 is a cross section of a tubular mantle of the present invention.

FIG. 1 illustrates one embodiment of the present invention. FIG. 1 is a portion of a tubular mantle or emitter 10. Mantle 10 is comprised of a cover 12. The cover 12 is comprised of a rare-earth material such as a layer of ytterbium oxide ceramic fibers. The rare-earth cover 12 covers a tubular porous ceramic substrate 14. The porous ceramic substrate 14 is made of a highly porous ceramic such as porous alumina or zirconia. Along the inner bore of the porous ceramic substrate 14 is a support mesh 16. The support mesh 16 may be made of a metallic or ceramic material.

Figure 2:
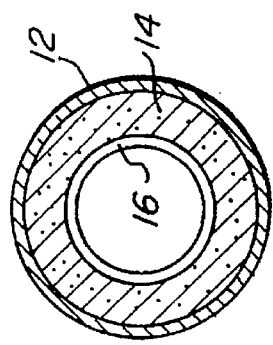
FIG. 2 is a cross section taken along line 2—2 in FIG. 1.

FIG. 2 illustrates the cross section of the tubular mantle 10 illustrated in FIG. 1. In FIG. 2, the composite or layered construction of the mantle 10 is more clearly illustrated.

With reference to FIGS. 1 and 2, the operation of the mantle or emitter 10 can readily be appreciated. A pressurized air-fuel mixture entering at one end of the mantle 10 is forced through the highly porous ceramic substrate 14. This provides the transporting and preheating of the air-fuel mixture to the rare-earth cover 12. At the rare-earth cover 12, a uniform stabilized surface combustion takes place, heating up to incandescent temperature the rare-earth fibers providing a highly radiant selective emitting surface. The electromagnetic radiation or light that is generated by the mantle or emitter 10 is directed onto a photovoltaic solar panel for the production of electricity. By selective emitting surface it is meant that the rare-earth fibers emit a predetermined narrow wavelength band of electromagnetic radiation. It is well known that rare-earth elements have characteristic emission properties. Therefore, rare-earth elements are selective emitters. Selective emitters have most of their photon emission in specific bands and emit a very small amount of energy in all the other spectral regions. Therefore, a selective emitter requires less energy input than a black/gray body to operate at a given temperature because it loses energy by emitting photons only in a narrow wavelength band. When a selective emission material is coupled to a photovoltaic cell whose conversion characteristics are closely matched to the material's emission bands, the photovoltaic cell converts the emitted photons to electricity at very high efficiency. The rare-earth elements emit narrow bands of electromagnetic radiation rather than a continuum as do most gray-body solids. The emission spectrum of these rare-earth ions in crystals have been extensively studied and are well known. Early spectral emittance work on monolithic rare-earth oxide structures, sintered to a high density of approximately 97 to 98 percent theoretical, showed strong emission bands characterized by high emissivity values. These rare-earth oxides have proven to be chemically stable up to temperatures close to their melting point, and maintain their spectral emission characteristics for indefinite time, even in a highly oxidizing atmosphere. Some of these rare-earth oxides have been recognized as effective selective emitters for thermophotovoltaic energy conversion. The rare-earth ytterbium oxide (ytterbia) is the best match for silicon photovoltaic cells and the rare-earth erbium oxide (erbia) is a good match for the germanium photovoltaic cells, and other low band gap cells. However, the spectral efficiency of these monolithic emitters were not very high. Due to the highly dense composition, emittance of photons with energy below the desired band gap was also significant. The emission spectrum of a blackbody or a graybody material at a temperature of 1400° C. contains only 4.5% of the total radiated energy in the wavelength range which can be absorbed by a silicon photovoltaic cell. At higher emitter temperatures, above 2000° C., the percentage of emitted energy falling into the silicon cell's absorption band substantially increases, but operation at these high temperatures limits the practical use of such emitters. However, it has been theoretically and experimentally determined that a ytterbium oxide emitter, operating at 1400° C., provides at least 50% of the total energy emitted in a spectral range that can be utilized by a silicon photovoltaic cell, resulting in efficient conversion into electrical energy.

Figure 3:
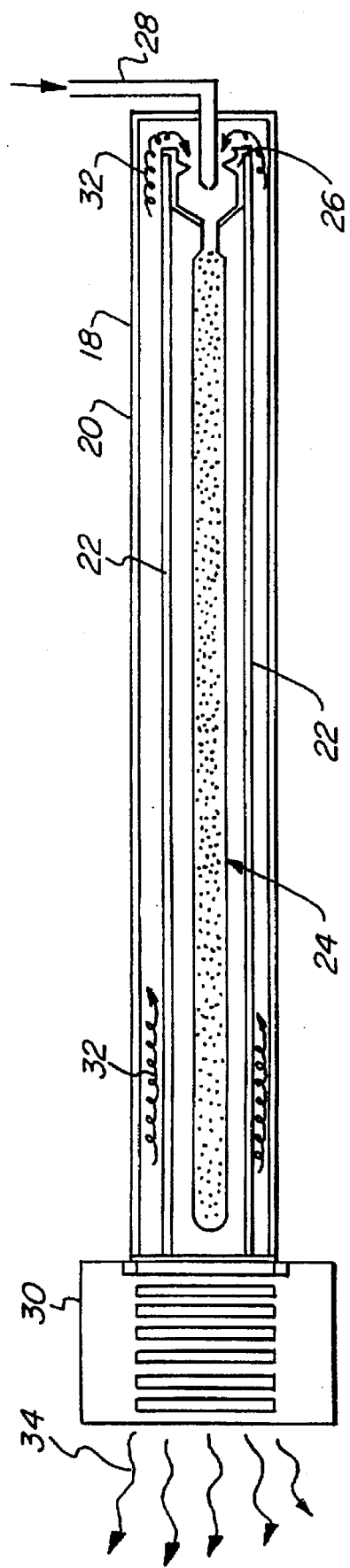
FIG. 3 is a schematic illustration of a burn-emitter tube of the present invention.

FIG. 3 illustrates another embodiment of the present invention. A burner-emitter tube is illustrated in FIG. 3. An outer glass tube 18 is made of quartz or a high temperature glass. Co-axially positioned within outer glass tube 18 is an inner glass tube 22. Co-axially positioned within the inner glass tube 22 is a mantle or emitter 24. The mantle or emitter 24 may be of the same construction as illustrated in FIGS. 1 and 2. Attached to one end of the mantle 24 is a venturi nozzle 26. The venturi nozzle 26 is also attached to the inner bore of inner glass tube 22. In one end of the venturi nozzle 26 is placed a gas or fuel inlet 28. The gas or fuel inlet 28 extends through a closed end of the outer glass tube 18, and into the venturi nozzle 26. At the other open end of outer glass tube 18 is positioned a heat exchanger 30. The inner glass tube 22 is open to the environment through heat exchanger 30 for the release of combustion gases 34. The operation of this embodiment of the present invention can readily be appreciated with reference to FIG. 3. Arrows 32 illustrate the primary air path for the travel of air to be used for combustion within the mantle 24. The air travels through the heat exchanger 30, through the outer toroidal gap formed between the outer glass tube 18 and the inner glass tube 22. The gas or fuel inlet 28 injects, under pressure, a hydrocarbon fuel through the venturi nozzle 26 and into the mantle 24. The passing of the pressurized fuel through the venturi nozzle 26 causes air used for combustion to be drawn into the mantle 24. The air used for combustion has a primary air path along the outer surface of the inner glass tube 22 which results in a preheating of the air prior to combustion. This helps recover part of the waste heat. The venturi nozzle 26 may be replaced with a small blower, not shown. Combustion within the mantle 24 takes place as described above, resulting in electromagnetic radiation being emitted of a predetermined and desirable wavelength or energy level. This wavelength or energy level is selected to result in an efficient conversion to electrical energy in the photovoltaic cells of solar panels. In the event a selective emitter is not utilized, the outer glass tube 18 may be coated with a band-pass filter 20. The placement of the band-pass filter 20 between the emitter and the photovoltaic cell permits the transmission of electromagnetic radiation centered around the band-gap of the photovoltaic cell used. The band-pass filter is necessary when a graybody is used as an emitter. The spectral distribution of electromagnetic radiation from a graybody emitter is similar to that of a blackbody, but with slightly lower emittance over the entire energy spectrum. Band-pass filters are available for transmission bands having a width of up to hundreds of nanometers. An additional benefit of the band-pass filter is that the filter rejects back to the emitter all of the radiating energy that has a wavelength outside the band-gap of the photovoltaic cell. Since the absorptivity of a graybody in thermal equilibrium is equal to its emissivity, a graybody with an overall emissivity equal to or greater than 0.95 can re-absorb and effectively utilize a large portion of the spectral energy reflected back by the band-pass filter 20. This re-absorbed energy contributes to maintaining the emitter at its working temperature, and allows operation with reduced fuel consumption.

Figure 4:
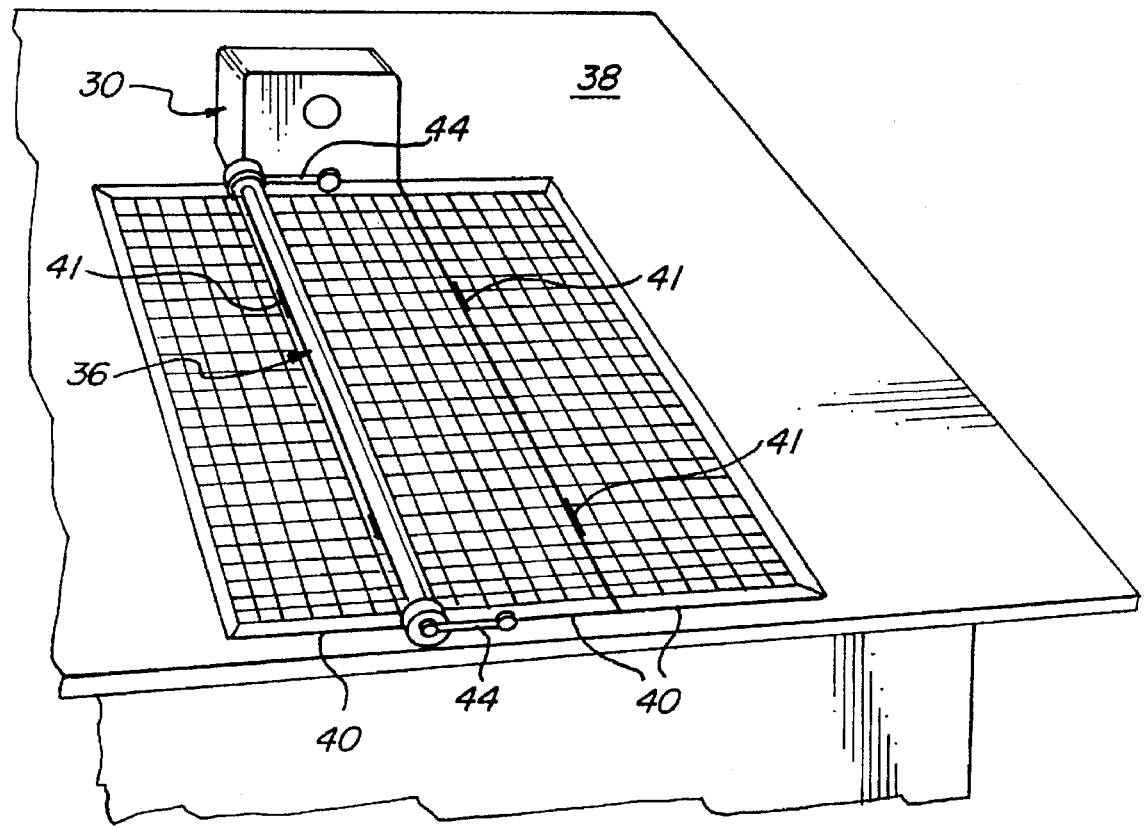
FIG. 4 is a perspective illustration of an electricity generating system using photovoltaic cells or solar panels in an open position.
Figure 5:
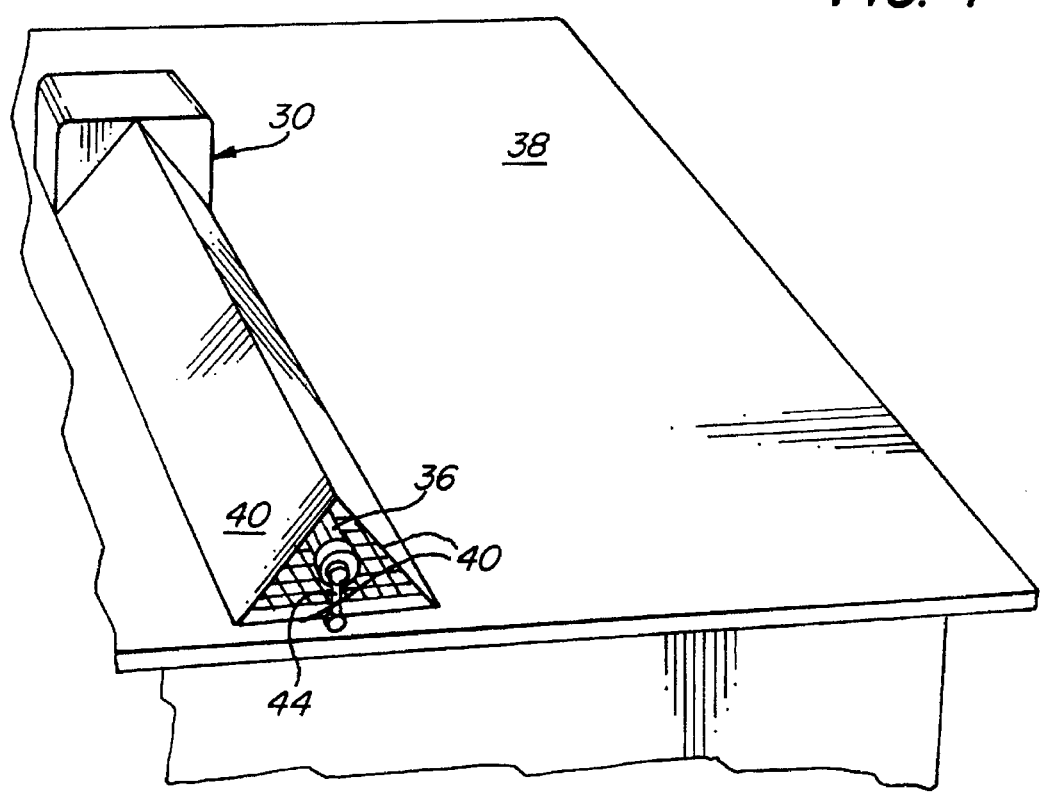
FIG. 5 is a perspective illustration of the electricity generating system as illustrated in FIG. 4 with the photovoltaic cells or solar panels in a closed position.

FIGS. 4 and 5 illustrate another embodiment of the present invention utilizing a mantle or emitter to illuminate a photovoltaic cell array. FIG. 4 illustrates three photovoltaic solar cell panels 40 laying flat on a surface 38, such as a roof. The three photovoltaic cell panels 40 are attached to each other with hinges 41. Placed over the photovoltaic cells or solar panels 40 is a burner-emitter tube 36. Attached to either end of the burner-emitter tube 36 are arms 44. Arms 44 are pivotally attached to the ends of the burner emitter tube 36 and to a point adjacent the photovoltaic cell panels 40. The arms 44 can be driven by a motor. In operation, when sunlight is available, the photovoltaic cell panels 40 form a plane and lie flat on the surface 38. However, at night, or during inclement weather, a motor drives arms 44, attached to either end of the burner-emitter tube 36, to pivot upward away from the plane of the photovoltaic cell solar panels 40 and to engage a position lock. The position lock holds the burner-emitter tube 36 in an upright position, as well as provides a means for introducing fuel into the burner-emitter tube 36. Fuel may also be introduced into the burner-emitter tube 36 through one of the arms 44. With the mantle emitter 36 securely fixed into position, the two outer photovoltaic cell solar panels 40 are caused to rotate upward forming a tubular structure, as illustrated in FIG. 5, having a triangular cross section. The axis of the burner-emitter tube 36 is placed at a central position within the folded photovoltaic cells or solar panels 40, such that the center lies equidistant from a perpendicular drawn from each plane of the photovoltaic cells or solar panels 40.

Figure 6:
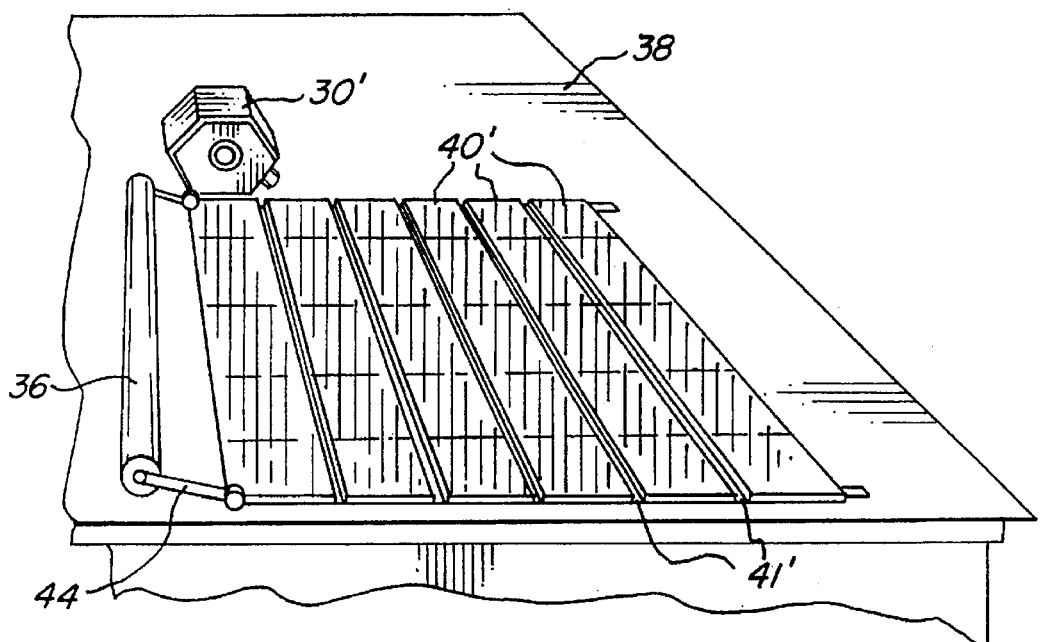
FIG. 6 is a perspective illustration of an electricity generating system using a six photovoltaic solar panel array in an open position.
Figure 7:
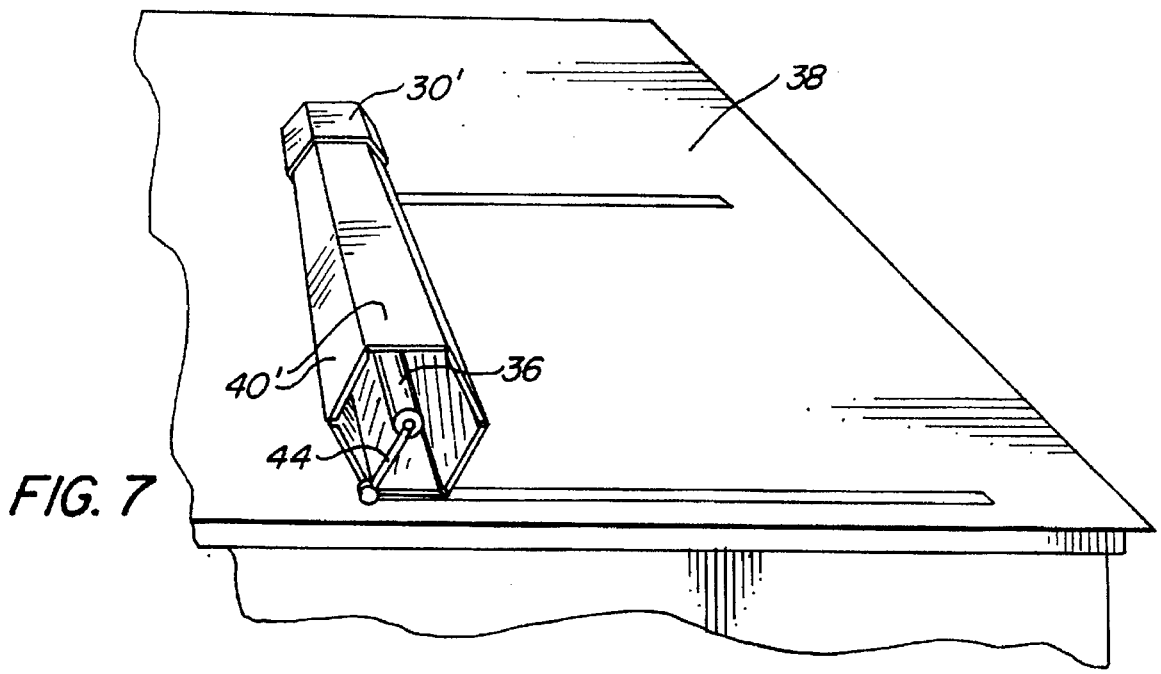
FIG. 7 is a perspective illustration of the electricity generating system as illustrated in FIG. 6 with the six photovoltaic solar panel array in a closed position.

FIGS. 6 and 7 illustrate another embodiment similar to that illustrated in FIGS. 4 and 5. However, the photovoltaic solar panels 40' form an array of six panels. A heat exchanger 30' is used at one end of the six panel enclosure. Each of the photovoltaic solar panels 40' are attached together by a hinge 41'. The embodiment illustrated in FIGS. 6 and 7 result in a more uniform illumination of the photovoltaic solar panels 40' by the burner-emitter tube 36.

Figure 8:
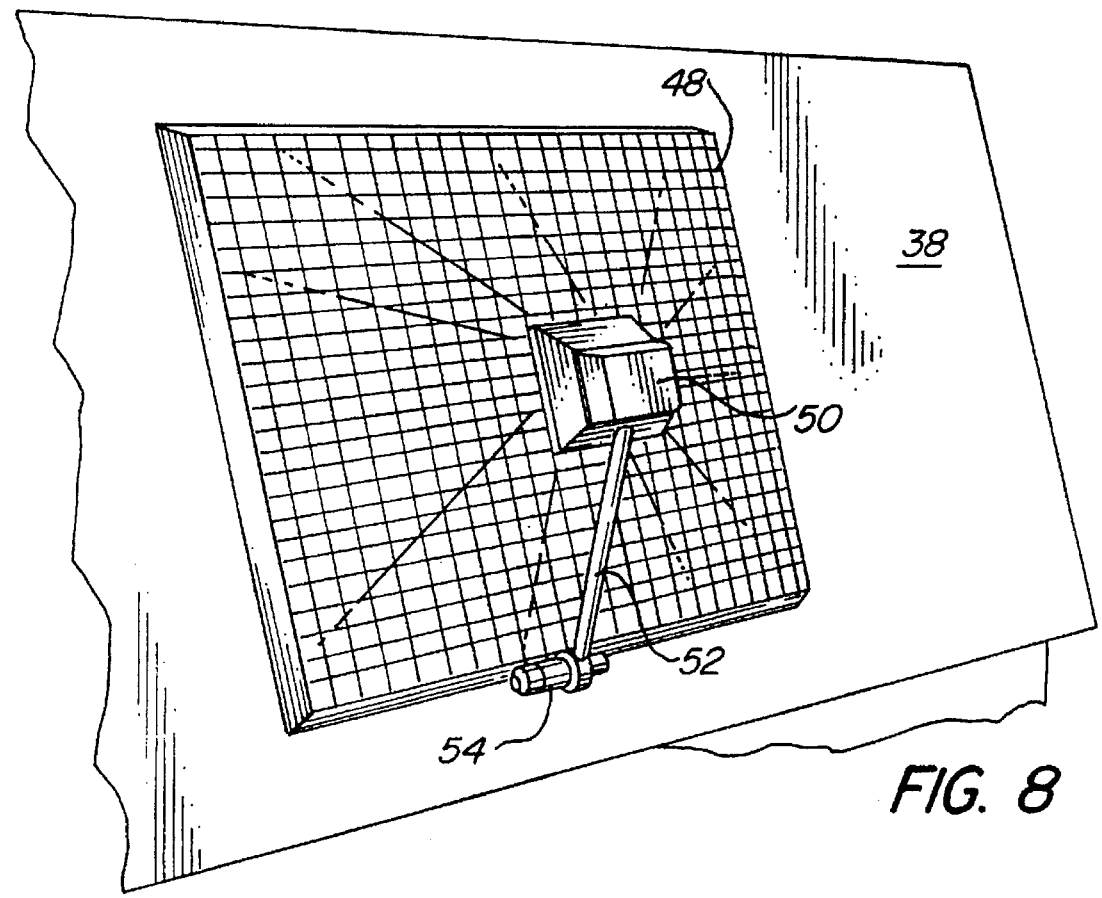
FIG. 8 is an electricity generating system utilizing a planar burner-emitter array.

FIG. 8 illustrates another embodiment of the present invention utilizing a single piece flat photovoltaic cell or solar panel 48 placed on a flat surface 38, such as roof. A motor 54 drives an arm 52 for positioning a planar mantle or burner-emitter 50 over the flat photovoltaic panel 48. Planar mantles or burner-emitters 50 are available that have emission intensities in excess of 4 watts/cm$^2$ which can be effectively utilized to provide an intensity of illumination equal to the maximum light intensity that the photovoltaic cell or solar panel 48 can receive from the sun. The planar mantles or burner-emitters 50 may be made of the same composite construction using rare-earth elements as described above. A selective emitter can therefore be produced increasing the efficiency of the photovoltaic cell or solar panel 48.

Figure 9:
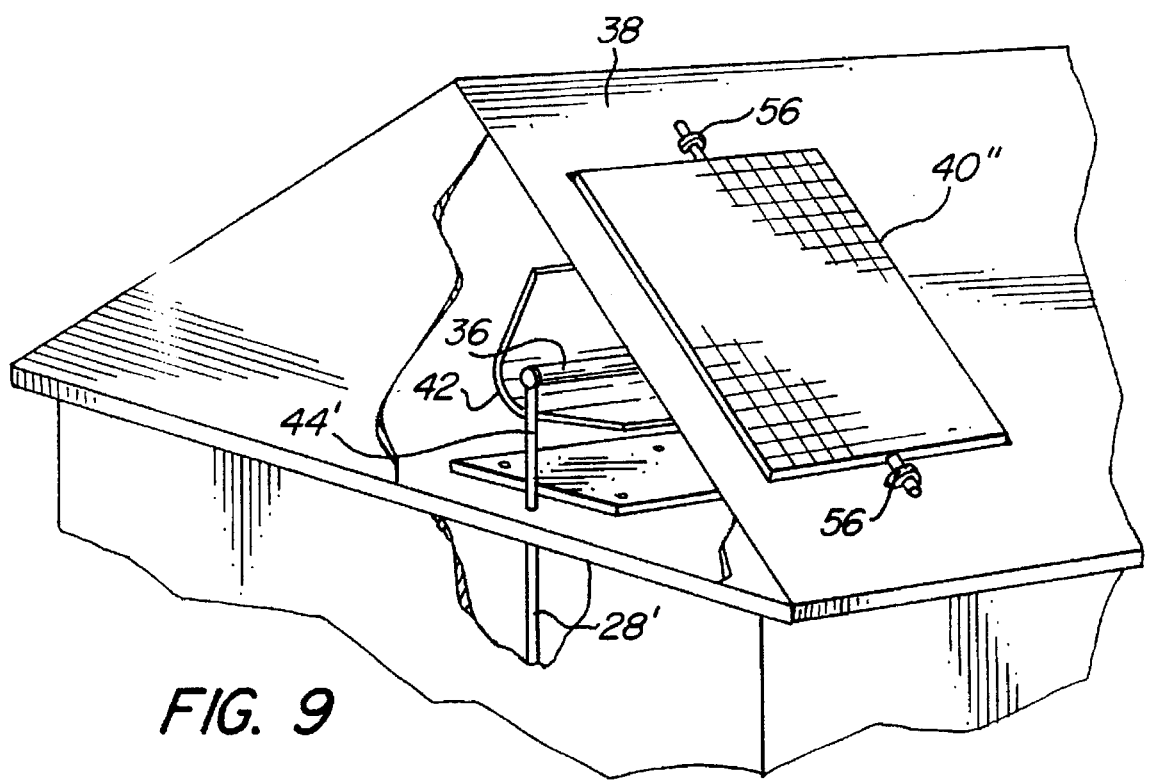
FIG. 9 is a sectional perspective view of an electricity generating system that utilizes a burner-emitter array underneath a solar panel that can be rotated one hundred and eighty degrees.

FIG. 9 illustrates another embodiment of the present invention. In this embodiment the surface or roof 38 has a hole therein substantially the same size as a photovoltaic solar panel 40". The photovoltaic solar panel 40" is attached to the roof 38 by pivots 56. The pivots 56 permit the photovoltaic solar panel 40" to rotate one hundred and eighty degrees. A burner-emitter tube 36 is positioned under the roof 38. A concentrator 42 may be used with the burner-emitter tube 36 to reflect the electromagnetic radiation emitted from the burner-emitter tube 36 toward the photovoltaic solar panel 40". Rigid arm 44' holds the burner-emitter tube 36 in position, and also accommodates a fuel or gas line 28'. When sunlight is not available the photovoltaic solar panel 40" may be rotated to face the burner-emitter tube 36 thereby providing substantially continuous electrical power.

In any of the above embodiments, the waste heat recovered by the preheating of the primary air for combustion, by the heat exchanger 30, is a small fraction of the total heat carried away by the combusted gases. The amount not recovered can be used to heat residential homes, industrial space, military and commercial shelters, and to provide hot water. This may be done by the addition of a second section to the heat exchanger 30. In this way overall efficiency and cost effectiveness is increased.

Accordingly, the present invention provides several embodiments that greatly facilitate and make practical the use of photovoltaic cells or solar panels for conversion of electromagnetic energy or light into electrical power. The present invention permits electrical energy to be produced by a photovoltaic cell or solar panel continuously or on demand irrespective of natural light sources, the time of day, or weather.

While the present invention has been described with respect to several preferred embodiments, it should be appreciated by those skilled in the art that various modifications may be made without departing from the spirit and scope of this invention.

What is claimed is:

1. An on-demand electricity generating system comprising:

a photovoltaic cell;

a mantle movably mounted with respect to said photovoltaic cell; and positioning means, attached to said mantle, for positioning said mantle for efficient illumination of said photovoltaic cell, wherein said positioning means includes a movable arm attached to said mantle.

2. An on-demand electricity generating system as in claim 1 wherein:

said mantle is a selective emitter.

3. An on-demand electricity generating system as in claim 2 wherein:

a portion of said mantle is made of a rare-earth material.

4. An on-demand electricity generating system as in claim 3 wherein:

the rare-earth material is ytterbium oxide.

5. An on-demand electricity generating system as in claim 4 wherein said mantle comprises:

a porous ceramic; and an emitter covering said porous ceramic, whereby said emitter is heated to an incandescent temperature providing a spectral emission.

6. An on-demand electricity generating system as in claim 5 wherein:

said emitter is a selective emitter.

7. An on-demand electricity generating system as in claim 6 wherein:

said selective emitter is comprised of a rare-earth material.

8. An on-demand electricity generating system as in claim 7 wherein:

the rare-earth material is ytterbium oxide.

9. An on-demand electricity generating system as in claim 5 further comprising:

a mesh wherein said porous ceramic is formed over said mesh.

10. An on-demand electricity generating system as in claim 9 wherein:

said porous ceramic is alumina.

11. An on-demand electricity generating system as in claim 9 wherein:

said porous ceramic is zirconia.

12. An on-demand electricity generating system as in claim 1 further comprising a burner-emitter tube having an outer tube, said outer tube having a closed end and an open end, the open end open to the atmosphere; an inner tube placed within said outer tube whereby a toroidal gap is formed between said outer tube and said inner tube wherein said mantle is placed within said inner tube; and a fuel line placed through the closed end of said outer tube and into an open end of said inner tube, whereby fuel is burned within said mantle causing said mantle to produce electromagnetic radiation.

13. An on-demand electricity generating system as in claim 12 wherein said burner-emitter tube further comprises a heat exchanger placed on one end.

14. An on-demand electricity generating system as in claim 12 wherein said burner-emitter tube further comprises a venturi nozzle placed within the open end of said inner tube.

15. An on-demand electricity generating system as in claim 12 wherein said burner-emitter tube further comprises a band-pass filter placed between said mantle and said photovoltaic cell.

16. An on-demand electricity generating system comprising:

a photovoltaic cell pivotally mounted on a surface having a hole therein; and a mantle positioned under the surface, whereby when sunlight is unavailable to illuminate said photovoltaic cell, said photovoltaic cell may be pivoted one hundred and eighty degrees to be in a position to be illuminated by electromagnetic radiation emitted from said mantle.

* * * * *